United States Patent [19]

Asaumi et al.

[11] Patent Number: 4,533,581
[45] Date of Patent: Aug. 6, 1985

[54] HIGHLY HEAT-RESISTANT DISC ROLL

[76] Inventors: Hiroshi Asaumi, 1-17-30, Iwase, City of Kamakura, Kanagawa Prefecture; Shigeo Take, 1530-99, Terao, City of Ayase, Kanagawa Prefecture; Masazumi Akase, 303-1-2, Katsura-cho, Tozuka-ku, City of Yokohama, Kanagawa Prefecture; Isao Terada, 1-5-21, Tsurumi, Tsurumi-ku, City of Yokohama, Kanagawa, Japan

[21] Appl. No.: 473,105

[22] Filed: Mar. 7, 1983

[30] Foreign Application Priority Data

Mar. 9, 1982 [JP] Japan ................................. 57-35893

[51] Int. Cl.$^3$ .......................... B32B 5/16; B21B 27/00
[52] U.S. Cl. ...................................... 428/64; 428/324; 428/363
[58] Field of Search .................. 428/64, 333, 336, 516, 428/517, 405, 324, 363; 264/28, 110, 115, 122; 523/203, 213, 209, 205; 524/444, 445, 449, 450–452, 493

[56] References Cited

U.S. PATENT DOCUMENTS 4,416,043 11/1983 Aoki ........................................ 29/132

Primary Examiner—Paul J. Thibodeau

[57] ABSTRACT

Disclosed is a highly heat-resistant disc roll comprising laminated discs, each disc comprising 20 to 90% by weight, based on the total solids of mica particles, 1 to 35% by weight, based on the total solids, of a binder, 5 to 40% weight, based on the total solids, of an inorganic filler and 1 to 30% by weight, based on the total solids, of a reinforcing fiber.

1 Claim, No Drawings

HIGHLY HEAT-RESISTANT DISC ROLL

BACKGROUND OF THE INVENTION

The present invention relates to an asbestos-free disc roll.

In a step of producing glass sheets or in a step of heat treating thin plates or tubes of stainless steel, copper or brass, a so-called asbestos roll is used as a roll for transporting semi-products or articles thereon to be treated. This asbestos roll is ordinarily prepared by punching an asbestos plate having a thickness of about 6 mm into a disc, piling these discs so that a predetermined thickness is obtained, plunging a metal rod such as steel, which acts as a rotation shaft, through the piled discs, compressing the piled discs in the axial direction of the rotation shaft to form a dense structure and grinding the peripheral surface of the formed dense structure by a lathe or the like to finish the dense structure into a roll. This roll is a so-called disc roll.

When this disc roll is applied to the above-mentioned use, it is subjected to severe conditions such as being heated to a temperature of several hundreds to about 1000° C. or higher, and therefore, the disc roll is required to have a high heat resistance property. With regard to this point, ordinarily used asbestos rolls are not completely satisfactory. The reason is that the thermal characteristics of asbestos constituting the roll are insufficient. More specifically, when asbestos is heated at 400° to 800° C. or a higher temperature, water of crystallization is released and contraction is caused. Moreover, the central rotation shaft expands at such elevated temperatures. Accordingly, linear cracks are readily formed in the axial direction of the rotation shaft and annular cracks are readily formed in the direction rectangular to the axial direction of the rotation shaft. When these cracks are once formed, a high-temperature furnace gas enters these cracks causing the cracks to grow at an accelerating rate, with the result that the asbestos plates peel off and fall away from each other. Furthermore, gaps are formed between the asbestos plates and the rotation shaft, and the position of some asbestos plates deviate, with the result that convexities and concavities called "stairs" are formed on the surface of the roll. The above-mentioned cracking, falling and formation of stairs results in the degradation of the quality of a product such as a glass sheet passed thereon as well as causing an irregular compression on the glass sheet causing the glass sheet to break. In case of the heat treatment of a thin metal plate, the surface of the roll having cracks or stairs formed thereon is printed on the softened surface of the metal plate being treated thereon and the surface condition of the plate is drastically degraded.

Furthermore, since asbestos dust particles are harmful to the human body, the asbestos roll has a major drawback in that special attentions must be paid in the production and use of the asbestos roll.

In order to obviate the foregoing disadvantage, disc rolls prepared without using asbestos plates, for example, disc rolls prepared by using ceramic fibers instead of asbestos, have been proposed. However, since ceramic fibers are more rigid and brittle than asbestos, it is impossible to increase the density of the roll by strongly compressing discs. Accordingly, a roll prepared by using ceramic fibers has the disadvantage that the roll is readily worn down. Furthermore, ceramic fibers ordinarily contain granules called shots, and if the shots appear on the surface of the roll, they are likely to damage a material being treated thereon.

SUMMARY OF THE INVENTION

It is therefore a primary object of the present invention to provide a high-capacity disc roll which is excellent in its heat resistance and abrasion resistance properties and which does not damage the surface of a material to be treated thereon.

The disc roll of the present invention is prepared by using a plate-like shaped material formed into discs and comprises mica particles, a binder, an inorganic filler and a reinforcing fiber.

DETAILED DESCRIPTION OF THE PREFERRED EMBODIMENTS

As is well-known, mica which is used as a material for disc rolls has an excellent heat resistance property. As for industrially used mica, there can be mentioned white mica (muscovite), $[K](Al_2)[Si_3Al]O_{10}(OH)_2$, phlogopite, $[K](Mg_3)[Si_3Al]O_{10}(OH)_2$, and biotite, $[K](Mg,Fe^{2+})_3[Si_3Al]O_{10}(OH)_2$.

The following embodiments will be described with reference to phlogopite which has a high heat resistance and which is soft and has excellent flexibility properties.

Mica particles are formed by the cleavage of mica crystals into scales, and it is preferable to use mica particles having a size distribution of 10 to 1000$\mu$ for at least 60% by weight of the total mica particles. When mica particles having a particle size exceeding the above distribution range are used, the surface smoothness bf the disc roll is degraded, and especially when such large particles of white mica having a relatively high hardness are used, the surface of a soft material to be treated is readily damaged. If mica particles having too small a particle size are used, the thermal contraction of the roll tends to increase.

Incidentally, it is preferred that the amount of mica particles be 20 to 90% by weight, and especially 30 to 70% by weight, based on the total solids.

The process for preparing the disc roll of the present invention by using the above-mentioned mica particles will now be described.

When the roll of the present invention is prepared, mica particles are mixed with a binder, an inorganic filler, a reinforcing fiber and water in about 3 to about 50 times the amount of the total solids to form a slurry. The binder bonds the solid starting materials and retains the shape of a plate-like molded article and thus, the binder makes to preparation of a roll possible. Accordingly, either an organic binder which is burnt and lost under heating or an inorganic binder which is not lost under heating may be used in the present invention. As preferred examples of the inorganic binder, there can be mentioned hydraulic cements such as Portland cement and alumina cement, and adhesives such as sodium silicate, colloidal silica and alumina sol. Use of an excessive amount of the inorganic binder excessively hardens the surface of the disc roll, and a material to be treated thereon is readily damaged as well as the heat resistance characteristics thereof being degraded. If the amount of the inorganic binder is too small, the abrasion resistance of the roll is reduced. Accordingly, it is important that an appropriate amount of the inorganic binder should be used according to the properties of mica particles to be used. It is ordinarily preferred that the inorganic binder be used in an amount of 1 to 30% (by weight based on the total solids; the same will apply hereinafter unless otherwise indicated). As examples of the organic binder that can be used in the present invention, there can be mentioned starch, rubber latexes, vinyl acetate resin latexes and acrylic resin latexes. After use of the disc roll is started, the organic binder is gradually burnt and lost, and therefore, if the organic binder is used in too large an amount, the properties of the disc roll become unstable. Accordingly, it is preferred that the organic binder be used in an amount of up to 5%.

The inorganic filler fills spaces among mica particles and improves the surface smoothness and abrasion resistance of the disc roll, and furthermore, the inorganic filler improves the cutting processability of the disc in the preparation process. As the inorganic filler, there are used dine powders having a good heat resistance, such as talc, pyrophyllite, kaolin, bentonite, alumina, calcium carbonate, magnesia clinker, silica, diatomaceous earth and wollastonite. Wollastonite is especially effective for improving the heat resistance of the roll, because wollastonite has a fibrous shape though the length is 2 to 3 mm or shorter and it has a good heat resistance (structural changes such as dehydration, oxidation and crystallization are not caused under heating). It is preferred that the inorganic filler be used in an amount of 5 to 40%.

As the reinforcing fiber, there can be used inorganic fibers and/or organic fibers such as a ceramic fiber, a glass fiber, rock wool, an alumina fiber, pulp, rayon, a nylon fiber and a polypropylene fiber. The inorganic fiber is effective for reinforcing the disc during the preparation process or during the use, but if the inorganic fiber is used in an excessive amount, it is difficult to elevate the density of the roll to a desirable level and shots in the fiber come to appear on the surface of the roll and are likely to damage the surface of the material to be treated. Therefore, it is preferred that the inorganic fiber be used in an amount of 1 to 20%. The inorganic fiber is effective as the reinforcer, as well as the above-mentioned organic binder, in the process for the preparation of the roll. However, use of too large an amount of the organic fiber is not preferred. It is ordinarily preferred that the organic fiber be used in an amount of up to 10%.

As pointed out hereinbefore, the mica particles are mixed with the binder, the inorganic filler, the reinforcing fiber and water to form a slurry. The mixture of the starting materials in the form of a slurry is dehydrated and molded into a sheet or plate having a thickness of about 2 to about 70 mm according to an optional method, for example, a paper-making method or a dehydrating press-molding method.

The formed sheet or plate is then dried to harden the binder, and the obtained sheet or plate is punched into a disc. Furthermore, there may be adopted a method in which the slurry of the starting materials is cast into a mold having a disc-like shape and then press-molded under dehydration, and the molded disc is then dried.

A disc roll is prepared from the so-obtained discs according to the above-mentioned conventional method. The pressure adopted for compressing the piled discs after inserting a rotation shaft therethrough is ordinarily about 50 to about 250 kg/cm$^2$, though the preferred pressure differs to some extent according to the intended use of the disc roll. It is ordinarily preferred that the piled discs be compressed under such a pressure that the bulk density of the disc portion is 1.2 to 1.8 g/cm$^3$.

The disc roll of the present invention is advantageous over the conventional asbestos roll because there arises no environmental sanitary problem. Furthermore, the disc roll of the present invention has the following characteristic properties.

(a) Mica has a high melting point of about 1300° C. and the temperature for isolation of water of crystallization is 550° to 800° C. and is higher than that of asbestos. Moreover, the amount of water of crystallization in mica is 1 to 4% by weight and is smaller than in asbestos. In short, contraction due to the release of water of crystallization in mica is smaller than that in asbestos. Accordingly, the upper limit of customarily adoptable temperature is higher and degradation of the properties due to heat after initiation of the use thereof is controlled to a very low level.

(b) Mica particles formed by cleavage of mica crystals into scales have a very small thickness as compared with the particle size (the thickness is smaller than 1$\mu$ when the particle size is 10 to 1000$\mu$), and in the disc formed from the dehydration-molded sheet or plate, the mica particles are oriented in the plane direction, and these mica particles are oriented in the radial direction in the disc roll. Accordingly, the mica particles are contacted with one another through cleavage planes having a large area, and the contact strength among the mica particles is markedly increased. On the other hand, the thickness planes of the mica particles are arranged on the surface of the roll. By dint of this specific orientation of the mica particles as well as peculiar properties of mica, a special roll surface which is excellent in its abrasion resistance and softness properties and does not damage a material to be treated thereon can be formed.

The present invention will now be described with reference to the following experiments. In these experiments, the following tests were carried out.

(1) Cracking:

The appearance was observed with the naked eye, and an evaluation was made according to the following rating:

⊚ : not cracked at all

○ : slight cracks which are not practically significant

X: large cracks are formed and the roll cannot be used (2) Abrasion Resistance:

While the disc roll was being rotated at 10 rpm, a load having a linear pressure of 8 kg/cm$^2$ was imposed on the surface of the roll by a stainless steel plate for 1 hour. The degree of wearing of the roll was examined with the naked eye and an evaluation was made according to the following ratings:

○: good without any practical problems

X: bad (the roll cannot be used)

—: the abrasion resistance test is not performed because of formation of large cracks (3) Smoothness:

The roll was subjected to heat and examined with the naked eye, and an evaluation was made according to the following ratings:

⊚: very good

○: good

X: the roll cannot be used because of convexities and concavities

The results of the experiments are shown in Tables 1 through 6. Table 1 shows the compositions (% by weight) of experiments Nos. 1 through 5 using phlogopite as the main component and comparisons Nos. 1 through 3 using other material as the main component. Table 2 shows the properties of sheets having a thickness of 6 mm, which were prepared by a cylinder paper machine in the above-mentioned experiments and comparisons therefore. From the data shown in Table 2, it is seen that the dimensional changes under heating in comparisons Nos. 1 through 3 were larger than those in experiments Nos. 1 through 5. The above-mentioned sheets were punched into an annular disc having an outer diameter of 130 mm and an inner diameter of 60 mm, and disc rolls having a length of 150 mm were prepared from these discs under a compressive pressure of 200 kg/cm². The disc rolls were heated for 100 hours in an electric furnace maintained at a temperature shown in Table 3. The properties of the heat-treated disc rolls are shown in Table 3. From the results shown in Table 3, it is seen that the disc rolls of experiments Nos. 1 through 5 had good properties, whereas cracks were formed at high temperatures in the disc rolls of comparisons Nos. 1 through 3 and these roll discs were poor in their abrasion resistance. Table 4 shows the compositions (% by weight) of experiment No. 6 where an appropriate particle size was selected for phlogopite and comparisons Nos. 4 and 5 where an appropriate particle size was not selected for phlogopite. Table 5 shows the properties of sheets of experiment No. 6 and comparisons Nos. 4 and 5, corresponding to the sheets shown in Table 2. Table 6 shows the properties of disc rolls of experiment No. 6 and comparisons Nos. 4 and 5, corresponding to the disc rolls shown in Table 3. From the results shown in Tables 5 and 6, it is seen that in experiment No. 6, the dimensional change under heating was small and the properties at high temperature were excellent.

From these experimental data, it will readily be understood that a disc roll which is excellent in its heat resistance and abrasion resistance properties and which does not damage the surface of a material to be treated thereon can be provided according to the present invention.

TABLE 1

| Starting Materials | Compositions (% by weight) | | | | | | | |
|---|---|---|---|---|---|---|---|---|
| | Experiment No. | | | | | Comparison No. | | |
| | 1 | 2 | 3 | 4 | 5 | 1 | 2 | 3 |
| phlogopite (particle size*) | 72 | 50 | 62 | 72 | 55 | — | — | 15 |
| >1000μ (10) | 7 | 5 | 6 | 7 | 5.5 | — | — | 1.5 |
| 500–1000μ (30) | 22 | 15 | 19 | 22 | 16.5 | — | — | 4.5 |
| 10–500μ (40) | 29 | 20 | 25 | 29 | 22 | — | — | 6 |
| <10μ (20) | 14 | 10 | 12 | 14 | 11 | — | — | 3 |
| kaolin | 20 | 42 | 10 | 10 | — | 10 | 52 | 57 |
| bentonite | — | — | — | — | 10 | — | — | — |
| talc | — | — | — | — | 27 | — | — | — |
| wollastonite | — | — | 20 | — | — | — | 20 | 20 |
| Portland cement | — | — | — | — | — | — | — | — |
| starch | 2 | 2 | 2 | 2 | 2 | 2 | 2 | 2 |
| pulp | 6 | 6 | 6 | 6 | 6 | — | 6 | 6 |
| chrysotile asbestos | — | — | — | — | — | 88 | — | — |
| ceramic fiber | — | — | — | 10 | — | — | 20 | — |
| NBR latex | — | — | — | — | — | — | — | — |

*each parenthesized value represents the content (% by weight) based on phlogopite alone

TABLE 2

| | Properties of Sheets | | | | | | | |
|---|---|---|---|---|---|---|---|---|
| | Experiment No. | | | | | Comparison No. | | |
| Properties | 1 | 2 | 3 | 4 | 5 | 1 | 2 | 3 |
| density (g/cm³) of sheet | 0.95 | 0.98 | 1.00 | 0.90 | 1.05 | 1.00 | 1.00 | 1.00 |
| dimensional change ratio (%) under heating | | | | | | | | |
| 500° C. | −0.1 | −0.1 | −0.1 | −0.1 | −0.1 | −0.4 | −0.3 | −0.2 |
| 600° C. | −0.2 | −0.3 | −0.1 | −0.2 | −0.1 | −0.6 | −0.4 | −0.4 |
| 800° C. | −0.3 | −0.4 | −0.2 | −0.3 | −0.3 | −1.4 | −0.8 | −0.6 |
| 1000° C. | −0.4 | −0.5 | −0.2 | −0.3 | −0.4 | −1.6 | −1.0 | −0.8 |

TABLE 3

| Heating Temperature | Test Item | Properties of Disc Rolls | | | | | | | |
|---|---|---|---|---|---|---|---|---|---|
| | | Experiment No. | | | | | Comparison No. | | |
| | | 1 | 2 | 3 | 4 | 5 | 1 | 2 | 3 |
| 500° C. | cracking | ◎ | ◎ | ◎ | ◎ | ◎ | ○ | ◉ | ◉ |
| | abrasion resistance | ◎ | ◎ | ◎ | ◎ | ◎ | ◎ | ○ | ○ |
| 600° C. | cracking | ◎ | ◉ | ◎ | ◎ | ◎ | ○ | ○ | ○ |
| | abrasion resistance | ◎ | ◎ | ◎ | ◎ | ◎ | ◎ | X | ○ |
| 800° C. | cracking | ◎ | ○ | ◎ | ◎ | ◎ | X | X | X |
| | abrasion resistance | ◎ | ◎ | ◎ | ○ | ◎ | — | — | — |
| 1000° C. | cracking | ○ | ○ | ◎ | ◎ | ○ | X | X | X |
| | abrasion resistance | ◎ | ◎ | ◎ | ○ | ◎ | — | — | — |
| pack density (g/cm³) of discs | | 1.65 | 1.70 | 1.65 | 1.65 | 1.70 | 1.70 | 1.75 | 1.72 |

TABLE 4

| Starting Materials | Compositions (% by weight) | | |
|---|---|---|---|
| | Experiment No. 6 | Comparison No. 4 | Comparison No. 5 |
| phlogopite (particle size*) | | | |
| >1000μ | (10) 8 | (85) 70 | (—) — |
| 500–1000μ | (30) 25 | (5) 4 | (5) 4 |
| 10–500μ | (40) 33 | (5) 4 | (10) 8 |
| <10μ | (20) 16 | (5) 4 | (85) 70 |
| kaolin | 10 | 10 | 10 |
| starch | 2 | 2 | 2 |
| pulp | 6 | 6 | 6 |

*each parenthesized value represents the content (% by weight) based on phlogopite alone

TABLE 5

| Properties | Properties of Sheets | | |
|---|---|---|---|
| | Experiment No. 6 | Comparison No. 4 | Comparison No. 5 |
| density (g/cm³) of sheet | 0.95 | 0.85 | 0.98 |
| dimensional change ratio (%) under heating | | | |
| 500° C. | −0.1 | −0.1 | −0.1 |
| 600° C. | −0.2 | −0.2 | −0.2 |
| 800° C. | −0.3 | −0.3 | −0.4 |
| 1000° C. | −0.4 | −0.3 | −0.6 |

TABLE 6

| Heating Temperature | Test Item | Properties of Disc Rolls | | |
|---|---|---|---|---|
| | | Experiment No. 6 | Comparison No. 4 | Comparison No. 5 |
| 500° C. | cracking | ◎ | ◎ | ◎ |
| | abrasion resistance | ◎ | ◎ | ◎ |
| | smoothness | ◎ | X | ◎ |
| 600° C. | cracking | ◎ | ◎ | ◎ |
| | abrasion resistance | ◎ | ◎ | ◎ |
| | smoothness | ◎ | X | ◎ |
| 800° C. | cracking | ◎ | ◎ | O |
| | abrasion resistance | ◎ | ◎ | ◎ |
| | smoothness | ◎ | X | ◎ |
| 1000° C. | racking | ◎ | ◎ | X |
| | abrasion resistance | ◎ | O | — |
| | smoothness | ◎ | X | — |
| pack density (g/cm³) of discs | | 1.60 | 1.52 | 1.62 |

What is claimed is:

1. A highly heat-resistant disc roll comprising laminated discs, each disc comprising 20 to 90% by weight, based on the total solids, of mica particles, 1 to 35% by weight, based on the total solids, of a binder, 5 to 40% by weight, based on the total solids, of an inorganic filler and 1 to 30% by weight, based on the total solids, of a reinforcing fiber, at least 60% by weight of said mica particles having a particle size of 10 to 1,000 μm, said mica particles being phlogophite formed by cleavage of mica crystals into scales.

* * * * *